United States Patent [19]

Geessink

[11] 4,371,490

[45] Feb. 1, 1983

[54] CHEESE MOULD AND/OR FOLLOWER WITH ROUGHENED INNER SURFACE AND METHOD FOR MAKING SAME

[76] Inventor: Bernard T. Geessink, Frans Halslaan 5, Musselkanaal, Netherlands

[21] Appl. No.: 235,603

[22] Filed: Feb. 18, 1981

[30] Foreign Application Priority Data

Feb. 20, 1980 [NL] Netherlands ................... 8001029

[51] Int. Cl.³ .................... A23C 19/05; B29C 17/12; B29C 25/00

[52] U.S. Cl. .................................. 264/162; 99/458; 99/465; 210/483; 210/498; 249/113; 249/134; 249/141; 264/219; 424/84

[58] Field of Search ............... 425/84; 249/112, 113, 249/134, 141; 210/498, 499, 483; 426/512, 515, 130, 478, 491; 264/219, 162; 99/465, 458

[56] References Cited

U.S. PATENT DOCUMENTS 3,838,955 10/1974 Dubbeld ............................. 425/84

FOREIGN PATENT DOCUMENTS 2656907 7/1977 Fed. Rep. of Germany ........ 425/84
2379246 8/1977 France ................................. 425/84

OTHER PUBLICATIONS

Gove et al., Webster's Third New International Dictionary, Merriam, Springfield, Mass., (1963), pp. 1001 and 2039.

*Primary Examiner*—Willard E. Hoag
*Attorney, Agent, or Firm*—Larson and Taylor

[57] ABSTRACT

A cheese mould having a wall of plastic material, which wall is provided with fine holes and the inner surface of which may be provided with grooves, said inner surface being subjected to a roughening treatment, for instance rubbing with a steel brush, course sand paper, a rasp or a scouring substance, so that small scratches are made, in order to improve the rind forming properties of the mould.

12 Claims, No Drawings

CHEESE MOULD AND/OR FOLLOWER WITH ROUGHENED INNER SURFACE AND METHOD FOR MAKING SAME

The invention relates to a cheese mould and/or follower, provided with a wall of plastic material with fine holes for draining away the whey with a non-smooth inner surface.

Such a cheese mould has been described in the Dutch Patent Application Nos. 73.02524 and 77.05990.

With these moulds it is possible to make cheese having a reasonable rind without using cheese cloth. It has been shown, however, that a quick and efficient rind forming has great economic value, firstly because certain sorts of cheese can be better stored when the rind is good and sound and secondly because the time of manufacture can be shortened if the forming of the rind occurs under favorable circumstances.

When using cheese moulds and followers having an irregular or non-smooth surface, that contacts the curd, it is of great importance, that the mould can be cleaned sufficiently by subjecting it to a normal cleaning process.

The invention aims to provide a cheese mould and/or follower of the above indicated type, which at the one hand procures a quick and good rind forming and at the other hand nevertheless can be easily cleaned.

The above aims are surprisingly realized by roughening the inner surface of the cheese mould and the follower. Though any manufacturing method resulting in a rough surface of the mould can be used when applying the invention, a mechanical treatment making small scratches is preferred. Such a mechanical treatment can be scouring, preferably with so called course sand paper, treating with a steel brush and possibly with a rasp or a scouring substance. Therewith in plastic material, such as polyethylene or polypropylene a surface is created, that locally has recesses, which normally are oblong and can be called scratches, but at the edge of these recesses or at their ends projections or fine threads are present. Consequently a surface is formed, that as has been shown, it extremely favorable for a quick, good and reliable rind forming. Further it has been shown that such an irregular surface can be cleaned as well as a non roughened surface. Herewith it is pointed out that the roughening according to the invention only adds very little to the manufacturing costs and implies a very important improvement of the cheese surface, that is the rind. Also the invention allows for an inner wall having fine grooves, to apply these grooves by a pressing treatment. Pressed or moulded grooves give generally a less satisfactory rind forming, when the roughening according to the invention has not been applied, so that the invention even enables to speed up the mechanical treatment of the inner wall: The small grooves can be made by moulding and thereafter the combination of the small grooves and the roughening gives a cheese mould having excessively good rind forming properties.

When the cheese mould has already grooves according a regular pattern, the invention can be applied by applying fine scratches that are superimposed upon this pattern. These scratches may have a direction or orientation that is completely independent on that of the small grooves.

Roughening the surface creates locally more or less scratch shaped recesses, but abutting to them also projections, which have incidentally the shape of fine threads or other particles that at the end of a scratch remain attached to the surface. The small irregularities have proven to be of great importance for obtaining a good cheese rind A further advantage of the invention is, that it is possible to reduce the height of irregularities, such as ribs or pyramids by removing the top parts of the ribs or pyramids, as naturally happens when scouring the surface. This means, that it is possible to reduce the rind thickness and/or modify the rind by varying the duration or intensity of the roughening treatment. By reason of this fact it is often very easy to adapt a cheese mould to make it suitable for a special type of cheese and/or special desires, simply by varying the roughening treatment.

The invention provides also a method for manufacturing a cheese mould and/or follower of plastic material consisting in that the inner surface of a mould or a follower, provided with fine perforations is subjected to rubbing with a mechanical cleaning means, such as a steel brush, a rasp or a scouring substance. This treatment can be applied as well to newly manufactured cheese mould or followers as to cheese mould or followers which have already been in use during a considerable time.

The scratches formed by applying the invention generally are visible with the naked eye and generally give, when feeling the surface with a finger a palpable roughness. Of course the surface is also less reflectant than the surface of a corresponding cheese mould, but not according to the invention, that means of which the surface has not been roughened.

Finally a very simple embodiment of the invention consists in that in case small grooves or such like are applied in the inner surface of a cheese mould or follower, to do this with a non-sharp chisel or fraise. Then at the edge of the grooves irregular recesses and projections are created that are completely comparable to the scratches obtained by roughening. The quite remarkable thing is, that work, that up to now would have been unconditionally rejected by each man of the art, to the contrary has superior qualities.

What I claim is:

1. Cheese mould provided with a wall of plastic material with fine holes for draining away the whey and a roughened non-smooth inner surface provided with a regular pattern of grooves, and superimposed upon this pattern, fine scratches in an irregular pattern.

2. Cheese mould according to claim 1, in which the roughening of the surface is formed by local scratch-like recesses with respect to the original surface and, abutting to them, projections projecting out of the original surface.

3. Cheese mould according to claim 2, in which at least part of the projections have a thread shape.

4. Cheese mould follower provided with a wall of plastic material having a roughened inner surface, said inner surface including a regular pattern of grooves and, superimposed upon this pattern, fine scratches in an irregular pattern.

5. Cheese mould follower according to claim 4, in which the roughening of the surface is formed by local scratchlike recesses with respect to the original surface and, abutting to them, projections projecting out of the original surface.

6. Cheese mould follower according to claim 5, in which at least part of the projections have a thread shape.

7. Method for manufacturing a cheese mould in which the inner surface of a plastic mould provided with fine holes therein is, in a separate mechanical step after completion of the mold proper, subjected to a roughening treatment so as to provide a roughened non-smooth inner surface containing a plurality of randomly oriented scratches therein.

8. Method for manufacturing a cheese mould according to claim 7, in which with a non-sharp cutting means, such as a chisel or fraise, small grooves are applied in the surface, by reason of which at the edge of the grooves irregular fine recesses and projections are created.

9. Method for manufacturing a cheese mould according to claim 7 in which said roughening treatment comprises rubbing the inner surface with a mechanical cleaning means such as a steel brush, coarse sandpaper, a rasp or a scouring substance so as to provide the roughened surface.

10. Method for manufacturing a cheese mould follower in which the inner surface of a plastic follower provided with fine holes is, in a separate mechanical step after completion of the follower proper, subjected to a roughening treatment so as to produce a roughened inner surface containing a plurality of randomly oriented scratches therein.

11. Method for manufacturing a cheese mould follower according to claim 10, in which with a non-sharp cutting means, such as a chisel or fraise small grooves are applied in the surface, by reason of which at the edge of the grooves irregular fine recesses and projections are created.

12. Method for manufacturing a cheese mould follower according to claim 10 wherein said roughening treatment comprises rubbing said inner surface with a mechanical cleaning means such as a steel brush, coarse sandpaper, a rasp or a scouring substance.

* * * * *